United States Patent
Doerflinger (10) Patent No.: US 6,698,171 B2
(45) Date of Patent: Mar. 2, 2004

(54) TRACTOR-SUPPORTED LAWNMOWER HAVING MOWERS MOVABLE UP AND DOWN

(75) Inventor: David A. Doerflinger, Racine, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/188,219

(22) Filed: Jul. 1, 2002

(65) Prior Publication Data

US 2002/0184866 A1 Dec. 12, 2002

Related U.S. Application Data

(63) Continuation of application No. 09/652,846, filed on Aug. 31, 2000, now Pat. No. 6,412,258.

(51) Int. Cl.[7] .................................................. A01D 75/30
(52) U.S. Cl. ............................ 56/7; 56/14.9; 56/15.8
(58) Field of Search ........................ 56/6, 7, 14.9, 15.5, 56/15.8, 15.9, 14.7, DIG. 10, DIG. 14; 280/186, 144; 172/619, 680

(56) References Cited

U.S. PATENT DOCUMENTS

| | | | |
|---|---|---|---|
| 1,957,079 A | | 5/1934 | Ronning |
| 3,511,033 A | | 5/1970 | Strajel |
| 3,514,926 A | * | 6/1970 | Heth .............................. 56/7 |
| 3,735,572 A | * | 5/1973 | Kasberger ..................... 56/16.2 |
| 3,905,180 A | | 9/1975 | Akgulian |
| 4,956,965 A | | 9/1990 | Parsons |
| 5,293,729 A | | 3/1994 | Curry et al. |
| 5,970,690 A | * | 10/1999 | Toman ........................... 56/7 |
| 6,052,973 A | | 4/2000 | Tsuchihashi |
| 6,098,388 A | * | 8/2000 | Davies ........................ 56/249 |
| 6,109,814 A | | 8/2000 | Cox et al. |
| 6,341,478 B1 | * | 1/2002 | Sallstrom et al. ................ 56/7 |

* cited by examiner

Primary Examiner—Thomas B. Will
Assistant Examiner—Meredith Petravick
(74) Attorney, Agent, or Firm—Harness, Dickey & Pierce, P.L.C.

(57) ABSTRACT

A lawnmower with a tractor and a gang of mowers pivotally supported by the tractor for up and down motion when moving on the ground is provided. A mower support arm is pivoted on the tractor and has a pivot axis for each of the mowers, and a camming action is created by the up and down mower movement and that causes the pivot axis to move horizontally relative to the tractor to thereby avoid having the mowers move horizontally, and it maintains a constant spacing between the mowers and avoids having the mowers collide when moving up and down. Shorter length mowers can thus be used in the gang, thereby following the ground contour more closely.

20 Claims, 7 Drawing Sheets

Fig. 12
PRIOR ART

TRACTOR-SUPPORTED LAWNMOWER HAVING MOWERS MOVABLE UP AND DOWN

CROSS-REFERENCE TO RELATED APPLICATIONS

This application is a continuation of U.S. patent application Ser. No. 09/652,846, filed Aug. 31, 2000 now U.S. Pat. No. 6,412,258. The disclosure of the above application is incorporated herein by reference.

FIELD OF THE INVENTION

This invention relates to a lawnmower having a tractor and mowers movable up and down on the tractor, and, more particularly, it relates to a tractor and mower assembly of the gang type wherein the mowers are movable up and down and they maintain a constant horizontally related spacing between the mowers and relative to the tractor.

BACKGROUND OF THE INVENTION

Lawnmowers which have tractors supporting mowers with up and down movement relative to the tractor are known in the prior art. That type of gang mower is shown in U.S. Pat. Nos. 3,511,033 and 3,905,180, which are patents owned by the assignee herein. That art has a tractor pivotally supporting a mower support arm on which mowers are mounted and can move up and down either in response to riding over uneven ground or by powered lift and lowering cylinders connected to the support arms. In those arrangements, the support arms pivot about an axis to cause the extending ends of the support arms, along with the mowers attached to the extending ends, to move up and down along an arc centered about the pivot axis.

Those mowers are commonly reel mowers and they are arranged in side-by-side relationship along one common reel axis and in rows. The mowers will inherently move toward each other during their arcuate up and down movement, and there must be sufficient space between adjacent mowers in each row in order to avoid collisions with each other. Therefore, in an arrangement where the mowing mowers are adequately spaced apart in one row, they leave an unmowed swath between adjacent mowers. The mower of another row is thus positioned to mow that unmowed swath, and that mower must be of a length sufficient to mow that unmowed swath, and all the mowers are of that length.

The length of the mowers is determined by the required non-colliding spacing between adjacent mowers, and the mowers must be sufficiently long to permit the required spacing therebetween in order to avoid colliding upon up and down movement. To avoid collisions, the mowers must each be of a minimum length.

In contrast to the foregoing, mowers of only a maximum length, that is, a short mower, will best conform to the irregular contour of the ground over which it is riding. That results in a short mower being more efficient in complete and neat mowing, compared to a mower that must be of a longer length, such as that which is long to avoid the collision mentioned above.

Accordingly, it is the object of this invention to provide a gang type lawnmower with a relative short length for each mower in the gang, and thereby provide for improved mowing, compared to the prior art.

Also, when the mower is moving up and down by riding and mowing over irregular ground, and when under the control of the lift mechanism, this invention provides for a gang mower wherein the mowers move up and down in parallel vertical planes and thereby maintain a constant horizontal distance away from the respective vertical plane on which each mower is located. Thus the mowers avoid colliding with each other. In accomplishing this objective, the mowers are supported to avoid being moved laterally relative to each other and the tractor, in addition to supporting the mower for up and down movement.

Still further, the aforementioned object is accomplished automatically by the lawnmower assembly itself, and operator control or attention is not required.

Still further, the mowers of this invention are operatively maintained in their respective mowing positions relative to the tractor such that they mow along one vertical plane even though they are riding up and down over irregular or contoured ground, and they therefore do not move horizontally toward and away relative to the tractor, and the method is such that the mowers mow only in swathes parallel to the tractor, and they do not move toward each other.

This invention accomplishes the aforementioned and does so in conjunction with power lift mechanism which can control up and down movement of the mowers and which does not hinder the above-mentioned horizontal positioning of the mowers.

This invention employs a floating pivot which achieves the mower placement mentioned, and the entire arrangement is of a sturdy construction to provide the optimum pivotal support of the mower relative to the tractor.

DETAILED DESCRIPTION OF THE PREFERRED EMBODIMENT AND METHOD

As should be understood when viewing the drawings, the parts of the embodiment of this invention are shown in different positions and in full lines while, for clarity, the tractor is shown in dot-lines. Also, the following description refers to the drawings, and thereby the method of avoiding the lateral movement of the mowers relative to the tractor is inherent in that description and therefore is disclosed herein.

Figure 11:
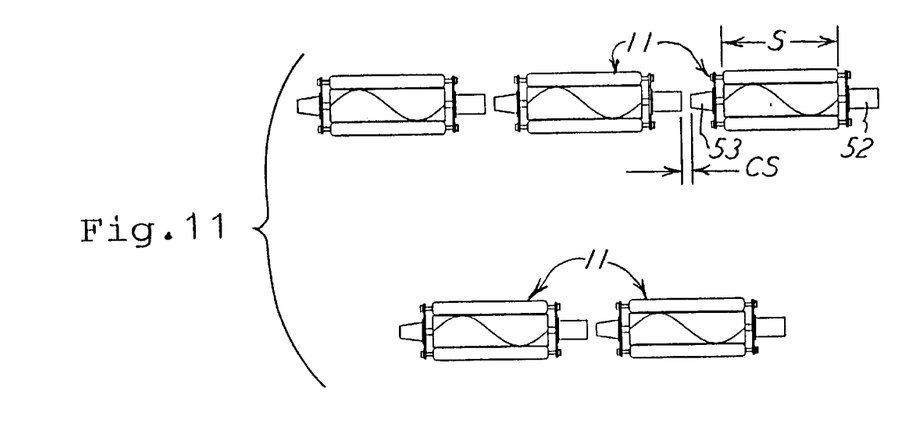
FIG. 11 is a top plan view of this invention's layout of five mowers of a gang with short mowers.

This gang-type lawnmower assembly has a tractor, generally designated 10, and lawnmowers, generally designated 11, supported on the tractor. There can be an odd number of mowers, such as three or five, as seen in FIG. 11 with the five mowers 11. Of course, the tractor rides on the ground to be mowed, and the mowers are all of one identical construction, and they too ride on the ground while being propelled by the tractor which itself is self-propelled in the usual manner.

There is a tractor frame beam 12 and an upright frame plate 13 which has two spaced apart openings 14 therethrough. Mounting studs 16 serve as pivot supports and extend rearwardly and horizontally as part of the tractor frame, and each stud 16 presents a horizontal pivot axis A.

Figure 2:
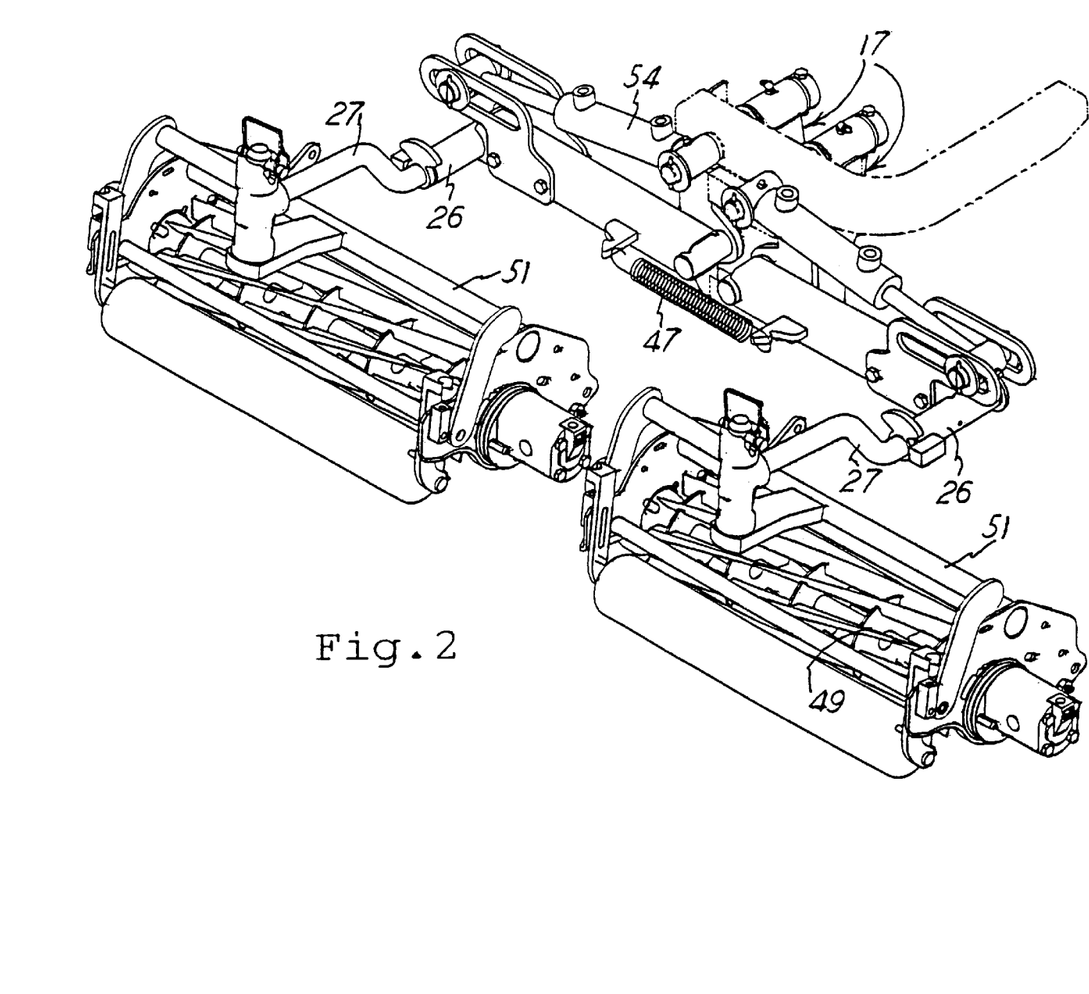
FIG. 2 is a perspective view, similar to FIG. 1 but with parts added thereto, with the parts assembled, and with the complete mowers added thereto.

It will be understood that the tractor has a longitudinal axis T extending fore-and-aft of the tractor and that is of the mowing direction of the lawnmower. Thus the axes A are parallel to and on laterally opposite sides of the tractor axis T. It will also be understood that the drawings show two side or wing mowers 11, symmetrically disposed and arranged, and there is a central mower, identical in structure to the shown mowers, and they are all positioned as seen in FIGS. 2 and 11.

Figure 1:
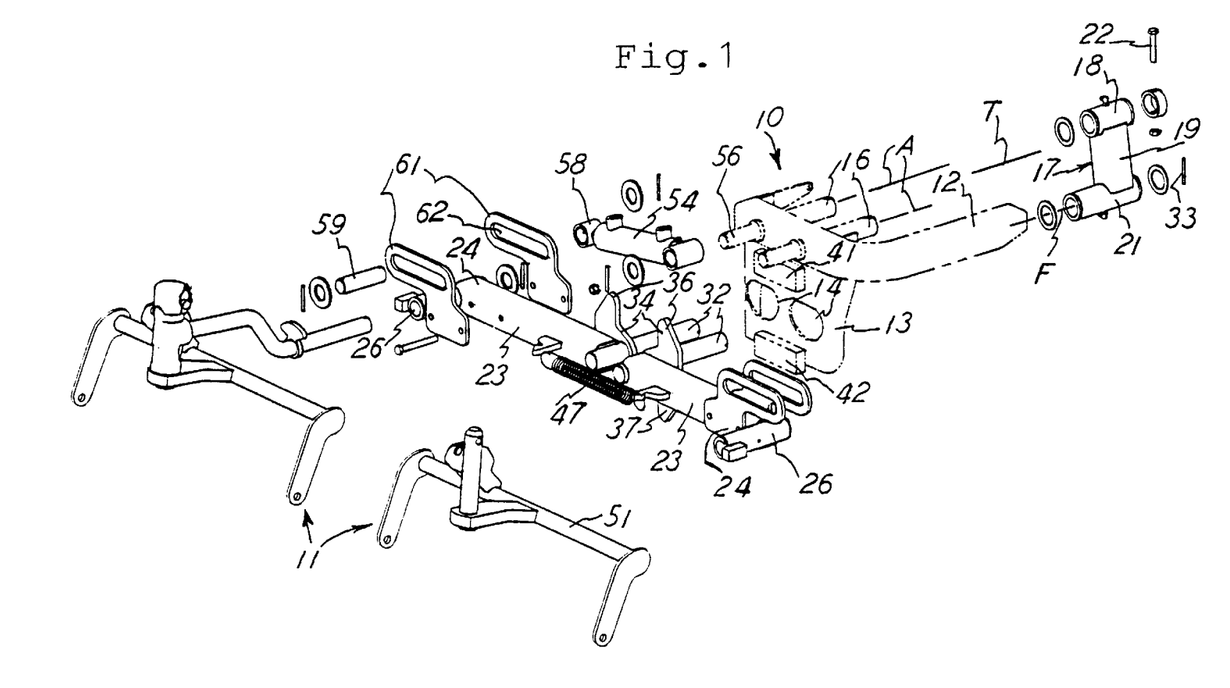
FIG. 1 is an exploded front perspective view of a portion of this invention, showing a fragment of a tractor in dot-dash lines, for clarity.
Figure 3:
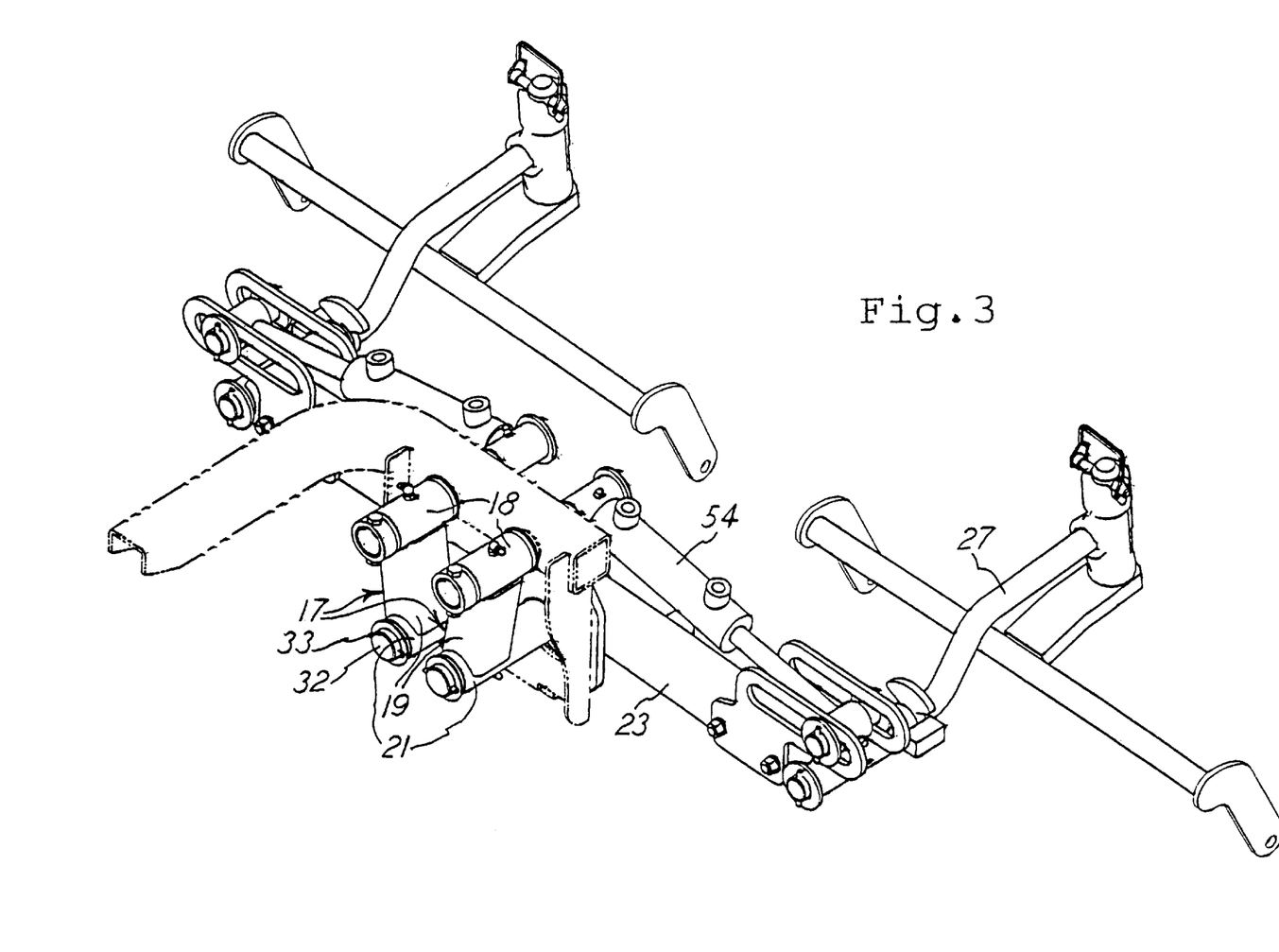
FIG. 3 is a rear perspective view of FIG. 2, and without the complete mowers.

As understood from FIGS. 1 and 3, there is a pivoting support 17 pivotally mounted on each stud or post 16, and the support 17 is in the form of a crank with a tubular sleeve 18, and a connecting offset portion 19, and a lower tubular sleeve 21. The two tubular sleeves 18 are respectively snugly pivotally mounted on the respective cylindrical post 16, and the two cranks 17 are suitably axially fixed with the posts 16 by axially restrictive assembly with pins, such as pin 22, which extend through the respective posts 16, but the cranks 17 are free to pivot and swing side-to-side on the respective post 16. The forward end of the tube 21 extends through a respective one of the openings 14 in the tractor frame, and the openings 14 are shaped and elongated sufficiently to allow for the swinging action of the sleeve 21.

In that arrangement, the cranks 17 extend downwardly so that the swinging movement is side-to-side on the tractor, in pendulum fashion, and that is laterally of the tractor fore and-aft axis T. As such, the crank presents a floating axis F.

Each laterally or wing positioned mower 11 has a pivotal support arm 23 with extending end 24 at the side or laterally of the tractor. As shown, the end 24 has a sleeve 26 attached thereto and extending in the fore-and-aft direction. Each mower assembly includes a connection of a push arm 27 which is snugly disposed in the sleeve 26 to rotate therein but is restricted by the shown assembly.

Figure 4:
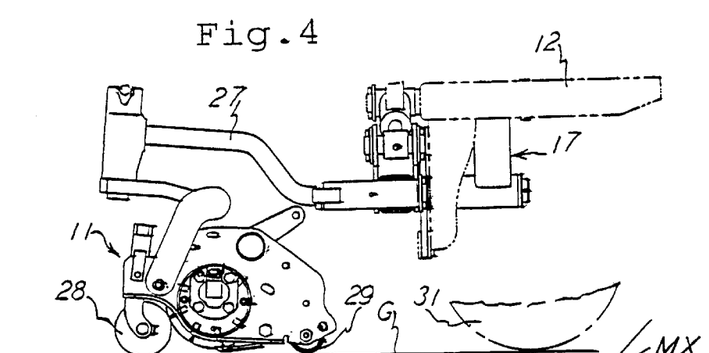
FIG. 4 is a side elevational view of FIG. 2, but on a reduced scale and with a fragment of a tire of the tractor added thereto.
Figure 5:
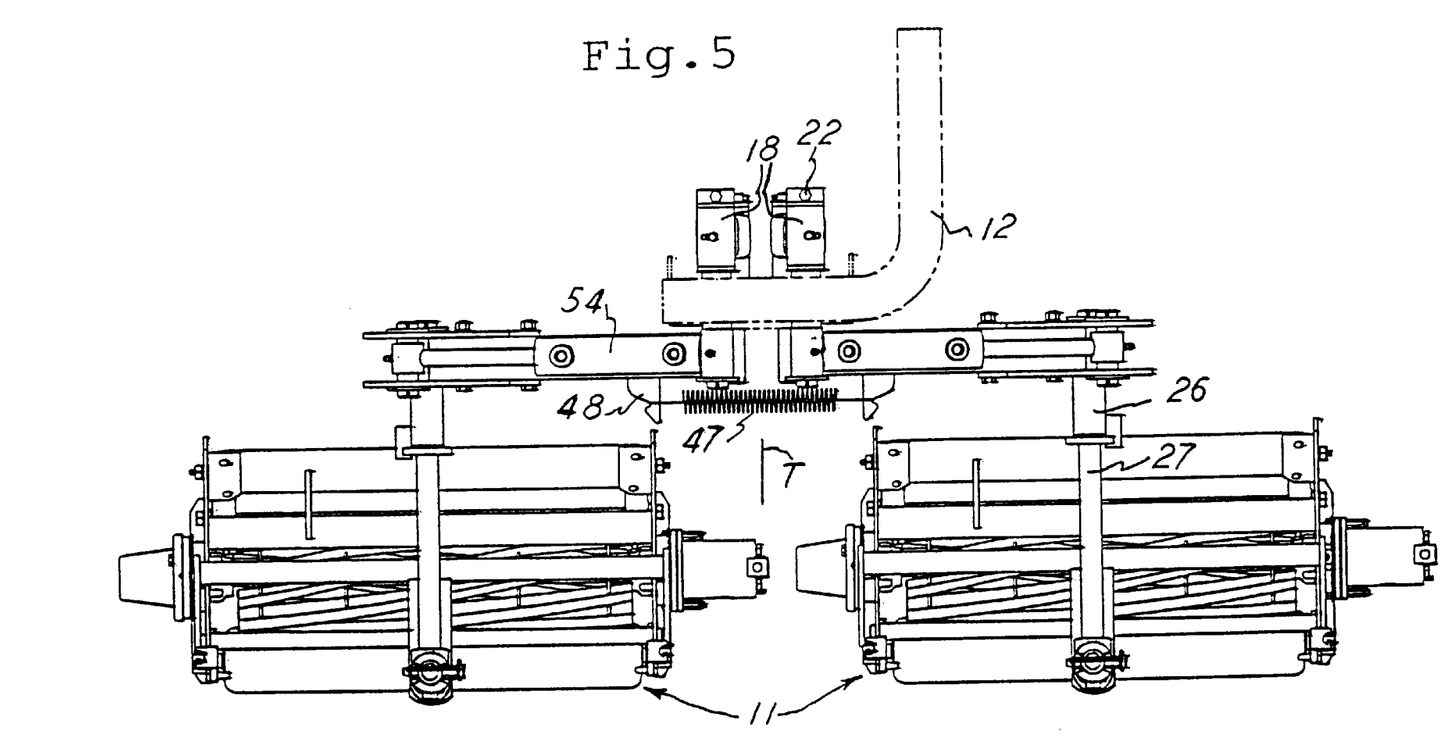
FIG. 5 is a top plan view of FIG. 2.

It will therefore be seen that each mower 11 is a reel mower and is movably supported on the ground G by front rollers 28 and rear rollers 29. FIG. 4 further shows that the tractor's usual tire 31 is also on the ground G and that is a common ground level for the tractor and the mowers in their respective operating positions when on the same level of ground.

The laterally inward end of the arm 23 relative to the fore-and-aft tractor axis T, has affixed thereto a cylindrical shaft 32 which extends horizontally and parallel to the axis T. Each shaft 32 is snugly received in a respective one of the two sleeves 21 and is pivotally supported therein. A pin 33 extends through the shaft 32 to axially secure the shaft 32 relative to the sleeve 21.

The shaft or posts 32 are therefore respectively piloted on the floating axes F, and thus the extending ends 24 of the support arms 23, along with the attached mowers 11, are able to move up and down. That movement may be as induced by irregular ground contour over which the mowers ride, that is, ground rises and depressions. Additionally, with the cranks 17 being swingable about their axes A to thereby laterally displace the floating axes F, the arms 23 move laterally of the tractor and its axis T.

Figure 10:
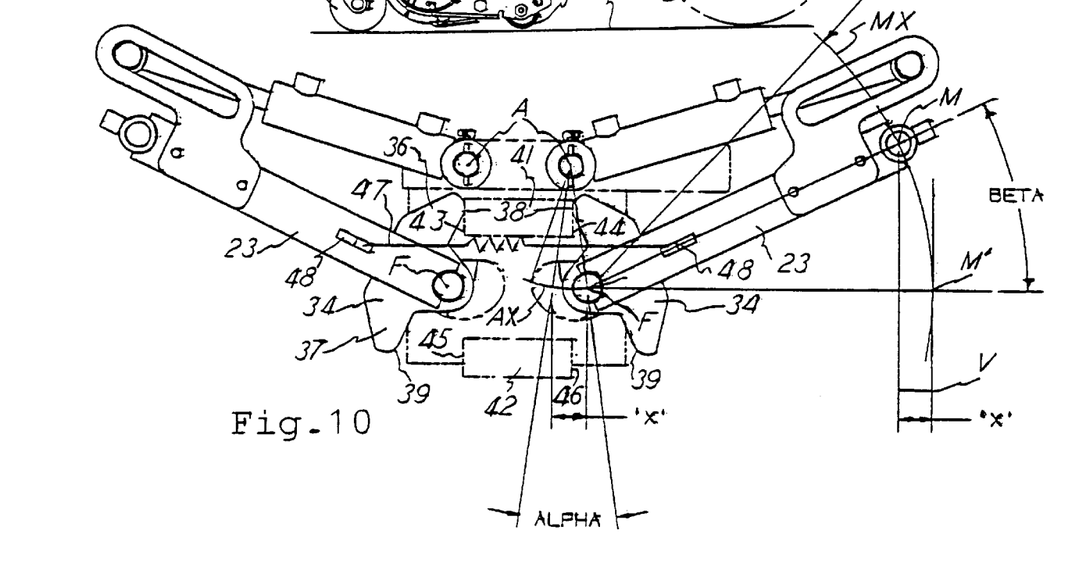
FIG. 10 is a front elevational view with the parts in the raised operative position of FIG. 8.

Affixed to each arm 23 is a cam plate 34 which can pivot about the axis F in step with the pivot of the respective arm 23 about the axis F. FIGS. 1 and 10 show that each plate 34 has a top end 36 and a bottom end 37 and those ends are equally positioned relative to the pivot axis F. The ends 36 and 37 have a respective cam surface 38 and 39.

Figure 8:
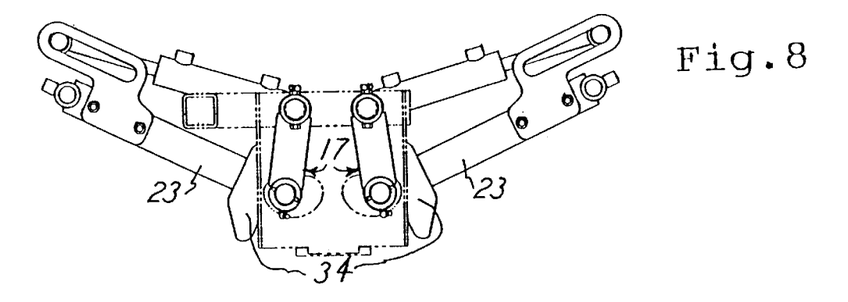

The tractor 10 has two blocks 41 and 42 affixed thereon, and FIG. 10 shows they present four upright surfaces 43, 44, 45 and 46, each of which extends vertically and is faced laterally outwardly of the respective two sides of the tractor, as shown. FIGS. 8 and 10 show the highest mow position, that is when the mower 11 is on a rise in the ground and it responds by moving up to the position shown. In that action, surface 38 of the plate 34 abuts the tractor surface 44 and that causes the movable pivot axis F to swing laterally along arc AX which is centered on axis A. That pendulum swinging action of axis F creates the laterally outward movement of the laterally inward end of the support arm 23, and the non-arcuate movement of the mower 11 which is articularly attached at axis M defined by sleeve 26.

In the showing in FIG. 10 and assuming the prior art condition of the absence of the floating pivot F, in the raised position shown, axis M would move along arc MX. From its lowered and starting position M', axis M would move horizontally and laterally inwardly relative to the tractor axis T and the vertical plane V by an undesirable distance X.

With the floating pivot F, under that raised condition, the floating pivot F will move horizontally and laterally outwardly by that distance X. The length of the support arm 23 and the distance from axis F to the contact surface 38, and conversely 39, causes the floating pivot F to be displaced a horizontal distance to compensate for the prior art horizontal movement of the axis M for the distance X, all to achieve the result that the axis M remains on the vertical plane V. Where the length of the support arm 23 is fourteen inches from axis F to axis M, the distance from the axis F to the cam 38 or 39 is made to vary according to the pivoted positions achieved, and that may be from about three to three and one-third inches, and the distance from the axis F to the axis A can be five inches.

Figure 9:
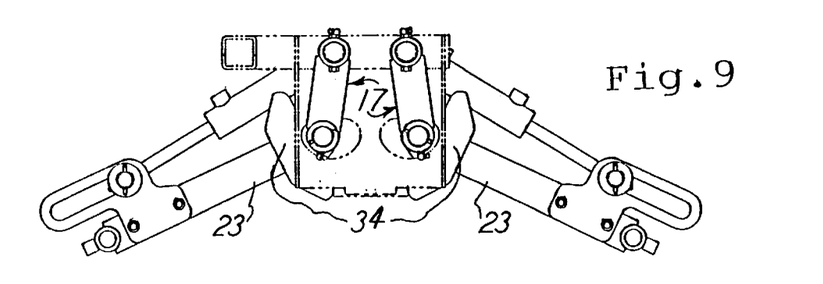

Of course, if the axis M were lowered, such as when the mower 11 rides down into a ground depression, then the downward pivot of the arm 23 would cause the cam surface 39 to abut the fixed tractor surface 46, such as in the FIG. 9 condition, then the floating pivot F would again move horizontally outwardly by a distance X to again keep the axis M on its original vertical plane during straight-ahead lawnmower movement. In those conditions of up or down mower movement, if and when support arm 23 pivots through an angle BETA, axis F pivots about axis A through an angle ALPHA. The distance from axis F to the contact with the cam 38, and the length of the crank 17 from axes A to F, are dimensioned such that there is no horizontal movement of the axis M. Those two dimensions are only a minor or very small fraction compared to the length of the support arm 23, and thereby the desired horizontal control of the mower is achieved.

A tension spring 47 is suitably connected with the arm 23 to yieldingly urge the arm 23 horizontally inwardly relative to the tractor axis T, and thereby always hold either or both surfaces 38 and 39 of the plate 34 against the respective surfaces 43–46, as is apparent.

The entire construction is in left and right hand duplication, or mirror image on the tractor 10. So another support 17, arm 23, floating pivot F, and plate 34 are provided, as shown. Also, there is only a single spring 47 which is connected with the two arms 23 through an anchor 48 on each arm 23. It will be obvious that the up and down mower movement described, and the consequent described responses, can be for only one, or for more, of the mowers 11 and their respective connecting parts.

The mowers 11 are shown to include a cutting reel 49 and a connecting bail 51 which interconnects with the respective arms 23. Reel driving motors 52 and counterweights 53 are on the axial ends of the reels 49, and, because of the added length they present, they must be negotiated in the up and down movement of the mowers to avoid the collisions mentioned.

Figure 12:
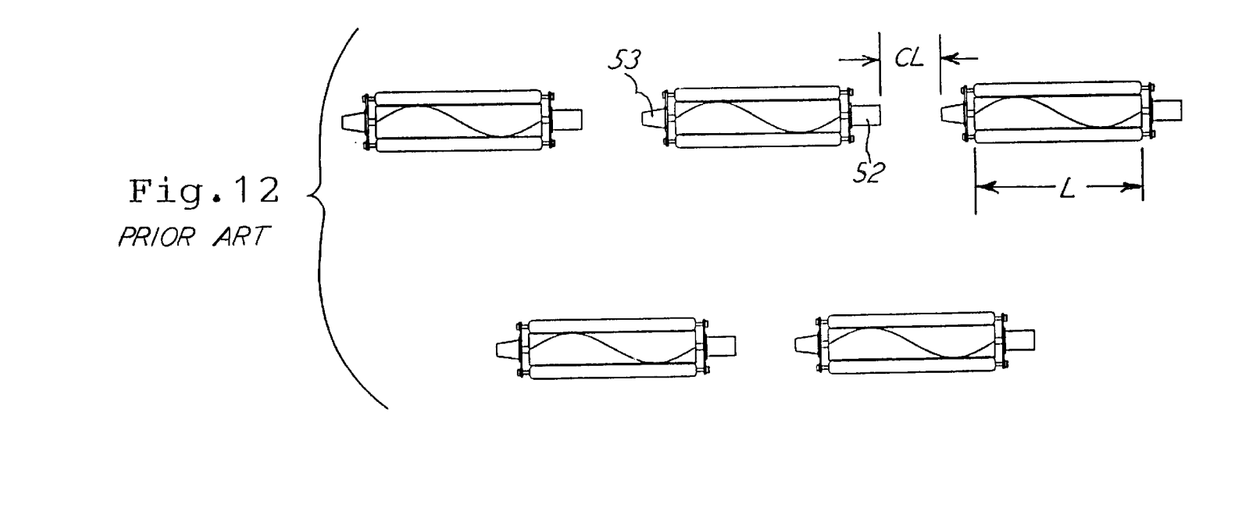
FIG. 12 is a top plan view of the prior art layout of five mowers of a gang with long mowers.

FIG. 11 shows that with this invention and in the vertical up and down movement of the mowers 11, the mowers 11 can be placed close together with only a clearance CS therebetween, and thus the length of those mowers can be short mowers S, of say eighteen inches, as desired. In the prior art assembly, FIG. 12 shows the necessary greater clearance CL and the consequent undesirable longer length mowers L, of say twenty-six inches as required by the prior art.

Figure 6:
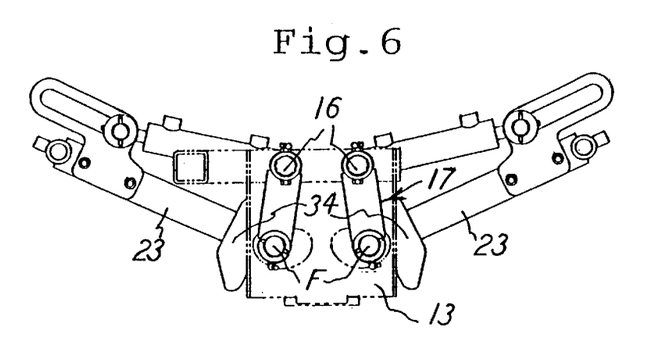
FIGS. 6–9 are rear elevational views showing the parts in four different operative positions.

To power lift and lower the mowers 11, there is shown a hydraulic lift cylinder assembly 54 pivotally mounted on a horizontally extending post 56 on the tractor 10. The cylinder assembly 54 has its rod 57 axially movable, and it presents a cross sleeve 58 which carries a cross pin 59. The extending end 24 of the arm 23 has two plates 61 affixed thereto and they present horizontal slots 62 which slidably receive the pin 59. In the arrangement, extension and contraction of the cylinder assembly 54 can cause the pin 59 to slide in the slots 62 in a lost motion connection between the cylinder assemblies and the arms 23. Thus, the up and down movement of the mowers 11 can be accomplished without overcoming the cylinder assembly 54 because of how they are connected. However, when it is desired to raise or lower the mowers 11 under the force applied by the cylinder assembly 54, then the cylinder assembly will cause the pins 59 to slid along the slots 62 to either end thereof, such as to the distal end for raising the mowers 11, as seen in FIG. 6, and that could be the self-propelled transport position for the entire lawnmower. In the FIG. 9 position, the mower 11 is limited by the cylinder assembly 54 in the lowest mowing position, for instance. Posts 56 are on axes A.

Figure 7:
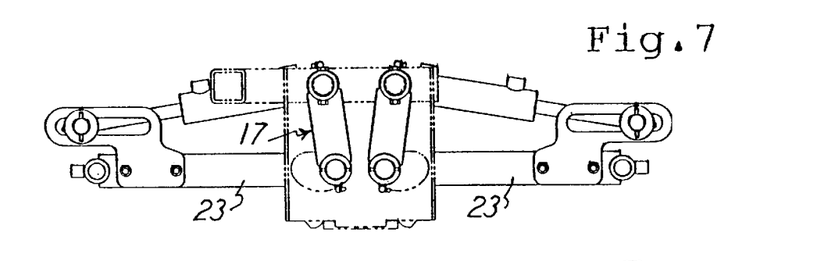

FIGS. 1–5 and 7 show the lawnmower in the level or a neutral position where it will mow when the tractor 10 and the mower 11 are on the common level ground G. In that position, the pivot axis F and the support arm axis M are on the same horizontal level. At that condition, the spring 47 has urged and will hold the two floating axes F closest toward each other, and the cranks 17 are disposed to be angled inwardly toward each other as seen in FIGS. 3 and 7. That provides for optimum swing action of the floating axis F because the sleeve 21 of the crank 17 swings through the lowermost portion of the arcuate circle on which it is centered, and thereby produces maximum horizontal movement of axis F as desired.

The method invention herein is that of providing a floating axis F, in a pendulum arrangement for movement transverse and relative to the tractor fore-and-aft axis, and arranging the cams 38 and 39 along with the four fixed tractor surfaces, and then moving the mowers up and down to create the cam action and the horizontal movement of the axis F. All to achieve the vertically constant positioning of the mowers 11 and the constant spacing between the mowers, even when the mowers move up and down about a pivot axis.

The arrangement is such that the axes A and F and the surfaces 43–46 are all respectively substantially vertically aligned. Also, in the neutral position, such as shown in FIG. 7, the support 17 and the arm 23 substantially form a right angle therebetween. In that position, the spring 47 always positions the arms 23 to have the axes F innermost on the tractor and thus closest to each other.

What is claimed is:

1. A lawnmower comprising:
   a tractor movable over ground in a forward operational direction;
   a support arm pivotally interconnected to and laterally extending from said tractor from a pivoting end to an opposite extending end, said support arm configured to displace axially away from said tractor upon pivotal movement about said pivoting end thereby displacing said extending end along a vertical axis; and
   a mower coupled to said extending end of said support arm and movable in contact with ground and under influence of forward movement of said tractor thereby correspondingly following said vertical axis upon contact with changing elevational ground contour.

2. The lawnmower of claim 1, further comprising a support connecting said support arm to said tractor, said support pivotally mounted on said tractor at a support axis parallel to and lateral from a fore-and-aft axis.

3. The lawnmower of claim 2 wherein said support is mounted to said tractor for swinging movement of said pivot axis relative to said tractor and in a plane transverse to a fore-and-aft axis and below said support axis.

4. The lawnmower of claim 2 wherein said pivot axis and said support arm extending end are disposed at the same elevation when said tractor and said mower are being supported on a common ground elevation.

5. The lawnmower of claim 1, further comprising a surface on said tractor in operative relationship with said support arm for imposing the axial displacement of said support arm upon pivotal movement of said support arm about said pivoting end.

6. The lawnmower of claim 5 wherein said support arm and said mower exist in one set on one lateral side of said tractor and also exist in another one of said set on the lateral side of said tractor opposite said one lateral side.

7. The lawnmower of claim 6, further comprising a tension spring operatively connected between said mower support arms for yieldingly urging said support arms toward each other.

8. A lawnmower comprising:
   a tractor having a fore-and-aft axis defined along a direction of forward operation;
   a support arm pivotally interconnected to said tractor through a pivot axis disposed parallel to said fore-and-aft axis, said support arm extending laterally from said pivot axis and movable at said pivot axis in a direction lateral to said fore-and-aft axis;
   a ground supported mower connected to an extending end of said support arm and movable in an up-and-down direction in response to contact with ground having a changing elevational contour thereby urging said support arm to correspondingly pivot up-and-down and move said pivot axis laterally from said fore-and-aft axis; and
   a crank swingably mounted on said tractor on a crank axis offset from said fore-and-aft axis, said crank swinging about said crank axis upon lateral movement of said support arm.

9. The lawnmower of claim 8 wherein said pivot axis and said support arm extending end are disposed at the same elevation when said tractor and said mower are being supported on a common ground elevation.

10. The lawnmower of claim 8, further comprising a surface on said tractor in operative relationship with said support arm for imposing the axial displacement of said support arm upon pivotal movement of said support arm about said pivoting end.

11. The lawnmower of claim 8 wherein said support arm and said mower exist in one set on one lateral side of said tractor and also exist in another one of said set on the lateral side of said tractor opposite said one lateral side.

12. The lawnmower of claim 11, further comprising a tension spring operatively connected between said mower support arms for yieldingly urging said support arms toward each other.

13. A lawnmower movable along a cutting surface, said lawnmower comprising:

a vehicle movable along the cutting surface defining a drive plane;

a support arm pivotally interconnected at a pivot axis to said vehicle, said support arm including an extending end laterally displaced a predetermined distance from said vehicle;

a mower coupled to said support arm and movable along the cutting surface defining a cutting place, said support arm pivoting about said pivot axis and displacing laterally and axially in response to said drive plane having a different elevation than said cutting plane thereby maintaining said extending end and thus said mower laterally at said predetermined distance from said vehicle; and a surface on said tractor in operative relationship with said support arm for imposing the axial displacement of said support arm upon pivotal movement of said support arm about said pivoting end, wherein said surface on said tractor includes a cam interposed between said support arm and said tractor at two locations respectively above and below said pivot axis, each of said cam being arranged to be operative to induce the axial displacement of said support arm.

14. The lawnmower of claim 13 wherein said pivot axis and said support arm extending end are disposed at the same elevation when said tractor and said mower are being supported on a common ground elevation.

15. The lawnmower of claim 13 wherein said support arm and said mower exist in one set on one lateral side of said tractor and also exist in another one of said set on the lateral side of said tractor opposite said one lateral side.

16. The lawnmower of claim 15 further comprising a tension spring operatively connected between said mower support arms for yieldingly urging said support arms toward each other.

17. A method for operating a lawnmower having a tractor movable along a fore-and-aft axis of operation, said tractor including at least one mower coupled thereto for movement along an axis perpendicular to said fore-and-aft axis, said at least one mower movably supported by and operable on turf having up-and-down changes in elevation, said method comprising:

mounting a support arm on the tractor along a pivot axis, said pivot axis being parallel to and movable laterally from the fore-and-aft axis, said support arm including an extending end laterally displaced from said pivot axis;

attaching the at least one mower to the tractor;

moving the lawnmower along the fore-and-aft axis of operation; and pivoting said support arm around said pivot axis in response to the at least one mower following the changes in elevation of the turf, said support arm further movable laterally to maintain the at least one mower along an axis perpendicular to the fore-and-aft axis.

18. The method for operating a lawnmower of claim 17, further comprising mounting a support on an axis parallel to the fore-and-aft axis and movable relative to the tractor, said support pivotally coupling said support arm to the tractor.

19. The method for operating a lawnmower of claim 18 wherein pivoting said support arm around said pivot axis includes applying a camming action operative between said support arm and said support.

20. The method for operating a lawnmower of claim 19 wherein said camming action includes imposing the pivotal movement of said support arm against a surface fixed on said tractor.

* * * * *

UNITED STATES PATENT AND TRADEMARK OFFICE
CERTIFICATE OF CORRECTION

PATENT NO.    : 6,698,171 B2
DATED         : March 2, 2004
INVENTOR(S)   : David A. Doerflinger

It is certified that error appears in the above-identified patent and that said Letters Patent is hereby corrected as shown below:

Column 5,
Line 38, "slid" should be -- slide --.

Column 7,
Line 27, "place" should be -- plane --.

Signed and Sealed this

Twenty-seventh Day of July, 2004

JON W. DUDAS
*Acting Director of the United States Patent and Trademark Office*